(12) United States Patent
Choi et al.

(10) Patent No.: US 9,357,334 B2
(45) Date of Patent: May 31, 2016

(54) METHOD AND APPARATUS FOR PERFORMING NETWORK REENTRY IN WIRELESS COMMUNICATION SYSTEM

(75) Inventors: Jinsoo Choi, Anyang-si (KR); Hangyu Cho, Anyang-si (KR); Jinsam Kwak, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 14/112,011

(22) PCT Filed: Nov. 30, 2011

(86) PCT No.: PCT/KR2011/009209
§ 371 (c)(1),
(2), (4) Date: Dec. 31, 2013

(87) PCT Pub. No.: WO2012/141400
PCT Pub. Date: Oct. 18, 2012

(65) Prior Publication Data
US 2014/0105183 A1   Apr. 17, 2014

Related U.S. Application Data

(60) Provisional application No. 61/474,273, filed on Apr. 12, 2011.

(51) Int. Cl.
*H04B 7/216* (2006.01)
*H04W 4/00* (2009.01)
*H04W 74/00* (2009.01)
*H04W 72/04* (2009.01)
*H04W 48/12* (2009.01)
(Continued)

(52) U.S. Cl.
CPC .............. *H04W 4/005* (2013.01); *H04W 72/04* (2013.01); *H04W 74/006* (2013.01); *H04W 48/12* (2013.01); *H04W 68/00* (2013.01); *H04W 74/0833* (2013.01)

(58) Field of Classification Search
CPC . H04W 4/005; H04W 72/04; H04W 72/0406; H04W 72/0413
See application file for complete search history.

(56) References Cited

U.S. PATENT DOCUMENTS

2007/0100968 A1   5/2007   Ordogh et al.
2010/0057485 A1   3/2010   Luft
(Continued)

OTHER PUBLICATIONS

"Draft Amendment to IEEE Standard for Local and metropolitan area networks, Part 16: Air Interface for Broadband Wireless Access Systems," IEEE P802.16m/D9, Oct. 6, 2010, 1253 pages, XP68048135.
(Continued)

*Primary Examiner* — Kan Yuen
(74) *Attorney, Agent, or Firm* — Birch, Stewart, Kolasch & Birch, LLP

(57) ABSTRACT

A method for performing network reentry by a Machine to Machine (M2M) device in a wireless communication system is provided. In the method, the M2M device receives information associated with an uplink resource for transmitting a ranging request message from a base station and transmits the ranging request message to the base station based on the received information associated with the uplink resource. The information associated with the uplink resource is masked with a random access identifier (RA-ID) and the RA-ID includes an indicator that indicates an M2M device dedicated ranging channel.

11 Claims, 5 Drawing Sheets

(51) Int. Cl.
*H04W 68/00* (2009.01)
*H04W 74/08* (2009.01)

(56) References Cited

U.S. PATENT DOCUMENTS

2011/0002303 A1* 1/2011 Cho et al. ................ 370/331
2011/0016321 A1 1/2011 Sundaram et al.

OTHER PUBLICATIONS

Cha et al., "Distribution of Initial Ranging Access for Network Reentry," IEEE 802.16 Broadband Wireless Access Working Group, IEEE C802.16p-11/0020, Mar. 6, 2011, pp. 1-15, XP17614407.

Josiam et al., "IEEE 802.16p Machine to Machine (M2M): Proposed Text from Large number of devices (DEV) Rapporteur Group," IEEE 802.16 Broadband Wireless Access Working Group, IEEE 802.16p-11/0001, Feb. 25, 2011, 21 pages, XP17780518.

Li et al., "Optimized schemes of network re-entry for M2M in 16m," IEEE 802.16 Broadband Wireless Access Working Group, IEEE C802.16p-11_0092r3, May 8, 2011, pp. 1-8, XP17712673.

Institute for Information Industry (III), "Addressing for M2M Devices and Corresponding Masking Schemes of A-A-MAP IEs", IEEE 802.16 Broadband Wireless Access Working Group, Mar. 14, 2011, pp. 1-9.

LG Electronics, "Proposed Text for Transmission of Dedicated Ranging Information and Signaling Support for M2M Devices", IEEE 802.16 Broadband Wireless Access Working Group, Jul. 10, 2011, pp. 1-5.

Huang et al., "Network reentry from idle mode for M2M devices without mobility", IEEE 802.16 Broadband Wireless Access Working Group <http://ieee802.org/16>, IEEE C80216p-11/0040r4, Mar. 16, 2011, pp. 1-4.

Park et al., "Proposed text for network reentry procedure of fixed M2M device", IEEE 802.16 Broadband Wireless Access Working Group <http://ieee802.org/16>, IEEE C802.16p-11/0018r1, Mar. 13, 2011, pp. 1-6.

* cited by examiner

METHOD AND APPARATUS FOR PERFORMING NETWORK REENTRY IN WIRELESS COMMUNICATION SYSTEM

CROSS REFERENCE TO RELATED APPLICATIONS

This application is the National Phase of PCT/KR2011/009209 filed on Nov. 30, 2011, which claims priority under 35 U.S.C. 119(e) to U.S. Provisional Application No. 61/474,273 filed on Apr. 12, 2011, all of which are hereby expressly incorporated by reference into the present application.

TECHNICAL FIELD

The present invention relates to wireless communication, and more particularly, to a method and apparatus for performing network reentry by a Machine to Machine (M2M) device, to which M2M communication is applied, in a wireless communication system.

BACKGROUND ART

Although conventional communication is mostly Human to Human (H2H) communication performed between terminals of users via a base station, Machine to Machine (M2M) communication has become possible along with development of communication technology. The term 'M2M communication' refers to communication that is performed between electronic devices as the term states. Although, in a broad sense, the term 'M2M communication' refers to wired or wireless communication between electronic devices or communication between a device that is controlled by a human and a machine, the term has generally been used recently to indicate wireless communication between electronic devices, i.e., wireless communication between devices.

In the early 1990's when the M2M communication concept was introduced, M2M was considered a concept such as remote control or telematics and associated markets were greatly limited. However, in recent years, M2M communication has been continuously rapidly developed, creating a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring of machines and facilities. In the future, M2M communication will be used for a wider variety of purposes, in combination with existing mobile communication and wireless high-speed Internet or low-power communication solutions such as Wi-Fi and ZigBee, and will no longer be limited to the B2B market and will expand its application field into the B2C market.

In the M2M communication era, all machines equipped with a SIM card can transmit and receive data such that it is possible to remotely manage and control all such machines. For example, the field of application of M2M communication technology is greatly broad such that M2M communication technology can be used for a great number of devices and equipment such as cars, trucks, trains, containers, vending machines, and gas tanks.

As the number of M2M device application types persistently increases, a very large number of such M2M devices will become present in the same base station. If a large number of M2M devices which are kept in an idle state attempt network reentry, a lot of connection collisions and connection congestion may occur, causing a reduction in communication performance. However, no studies have been conducted on a procedure for performing network reentry by M2M devices having characteristics different from conventional user equipments (i.e., H2H devices) when the M2M devices are in an idle state.

DISCLOSURE OF INVENTION

Technical Problem

An object of the present invention devised to solve the problem lies in providing a method and apparatus for performing a network reentry procedure in a wireless communication system, which can efficiently support M2M devices while minimizing the influence upon a network reentry procedure for conventional user equipments, i.e., H2H devices, in the wireless communication system.

Objects of the present invention are not limited to those described above and other objects will be clearly understood by those skilled in the art from the following description.

Solution to Problem

The object of the present invention can be achieved by providing a method for performing network reentry by a Machine to Machine (M2M) device in a wireless communication system, the method including receiving information associated with an uplink resource for transmitting a ranging request message from a base station, and transmitting the ranging request message to the base station based on the received information associated with the uplink resource, wherein the information associated with the uplink resource is masked with a random access identifier (RA-ID) and the RA-ID includes an indicator that indicates an M2M device dedicated ranging channel.

In another aspect of the present invention, provided herein is an apparatus for performing network reentry in a wireless communication system, the apparatus including a receiver, a transmitter, and a processor configured to control the receiver to receive information associated with an uplink resource for transmitting a ranging request message from a base station and configured to control the transmitter to transmit the ranging request message to the base station based on the received information associated with the uplink resource, wherein the information associated with the uplink resource is masked with a random access identifier (RA-ID) and the RA-ID includes an indicator that indicates an M2M device dedicated ranging channel.

In another aspect of the present invention, provided herein is a method for performing network reentry of a Machine to Machine (M2M) device by a base station in a wireless communication system, the method including transmitting information associated with an uplink resource for transmitting a ranging request message to the M2M device, and receiving the ranging request message from the M2M device based on the information associated with the uplink resource, wherein the information associated with the uplink resource is masked with a random access identifier (RA-ID) and the RA-ID includes an indicator that indicates an M2M device dedicated ranging channel.

In another aspect of the present invention, provided herein is an apparatus for performing network reentry of a Machine to Machine (M2M) device in a wireless communication system, the apparatus including a transmitter, a receiver, and a processor configured to control the transmitter to transmit information associated with an uplink resource for transmitting a ranging request message to the M2M device and configured to control the receiver to receive the ranging request message from the M2M device based on the information associated with the uplink resource, wherein the information associated with the uplink resource is masked with a random access identifier (RA-ID) and the RA-ID includes an indicator that indicates an M2M device dedicated ranging channel.

The information associated with the uplink resource may be included in a paging message.

Information associated with the M2M device dedicated ranging channel may be included in an Advanced Air Interface-System Configuration Descriptor (AAI-SCD) message.

The uplink resource may be the M2M device dedicated resource.

The information associated with the uplink resource may be a CDMA allocation A-MAP Information Element (IE).

Advantageous Effects of Invention

According to embodiments of the present invention, the M2M device can quickly and efficiently perform network reentry while minimizing the influence upon conventional user equipments (i.e., H2H devices) in a wireless communication system.

Advantages of the present invention are not limited to those described above and other advantages will be clearly understood by those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, although the following descriptions will be given in detail with reference to the case in which the wireless communication system is an IEEE 802.16 system, the following descriptions, except descriptions specific to IEEE 802.16, may be applied to any other wireless communication system (for example, an LTE/LTE-A system).

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term 'terminal' is used to generally describe any mobile or stationary user device such as a User Equipment (UE), a Mobile Station (MS), or an Advanced Mobile Station (AMS). In addition, the term 'base station (BS)' is used to generally describe any network node that communicates with the terminal such as a Node B, an eNode B, Advanced Base Station (ABS), or an Access Point (AP).

In a wireless communication system, a user equipment can receive information through downlink from a base station and can transmit information through uplink. Information transmitted or received by the user equipment includes data and various control information and various physical channels are provided according to the type or usage of the information transmitted or received by the user equipment.

Figure 1:
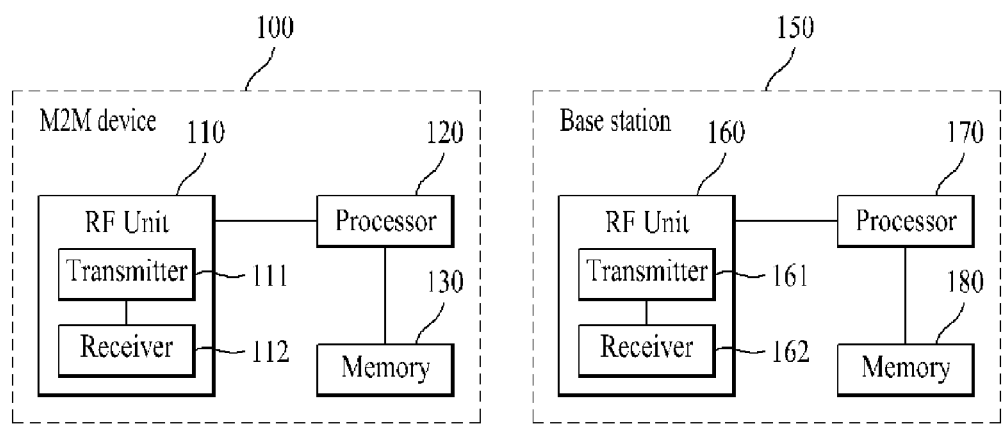
FIG. 1 illustrates a configuration of an M2M device and a base station according to an embodiment of the present invention.

FIG. 1 illustrates a configuration of an M2M device and a base station according to an embodiment of the present invention.

As shown in FIG. 1, the M2M device 100 and the base station 150 may include RF units 110 and 160, processors 120 and 170, and memories 130 and 180, respectively. The RF units 110 and 160 may include transmitters 111 and 161 and receivers 112 and 162, respectively.

The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices.

The processor 120 may transmit a signal to the transmitter 111 after performing a variety of processes upon the signal and may process a signal received by the receiver 112. When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the type of application. When the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates the case in which communication is performed between the M2M device 100 and the base station 150, M2M communication methods according to the present invention may be performed between M2M devices and each of the devices may have the same configuration as that shown in FIG. 1 and perform methods according to various embodiments described below.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices.

The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described below.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data.

The memories 130 and 180 are connected to the processors 120 and 170 and store operating systems, applications, and general files, respectively.

Each of the processors 120 and 170 may also be referred to as a controller, a micro-controller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

Such a device that communicates in an M2M manner as described above can be referred to as an M2M device, an M2M communication device, or a Machine Type Communication (MTC) device. On the other hand, a conventional terminal (or user equipment) may be referred to as a Human Type Communication (HTC) terminal or a Human to Human (H2H) device.

The number of M2M devices in a network will gradually increase as the number of machine application types increases. Such machine application types that are under discussion include, but are not limited to, (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion. As the number of machine application types increases, the number of M2M devices will significantly increase compared to the number of conventional devices, i.e., H2H devices.

A large number of M2M devices which are present in the same base station may cause problems such as connection collisions between such M2M devices and connection congestion between M2M devices and conventional user equipments (i.e., H2H devices). Therefore, there is a need to study how to efficiently distribute limited resources to a number of such M2M devices, which have been newly introduced, while minimizing the influence upon conventional user equipments (H2H devices).

That is, if a procedure for performing network reentry in an idle mode in a wireless communication system, which has been applied to conventional user equipments (i.e., H2H devices), is directly applied to a number of M2M devices, a problem such as connection congestion between conventional H2H devices and M2M devices occurs due to the characteristics of M2M devices. Therefore, there is a need to modify part of the network reentry procedure.

Figure 2:
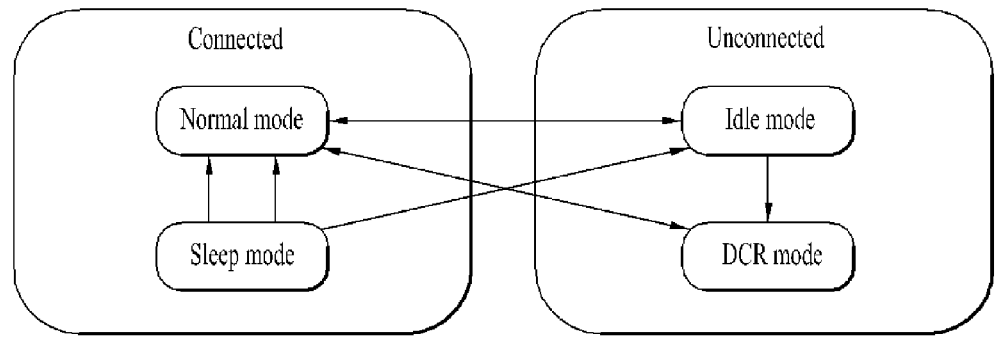
FIG. 2 is a state diagram of a user equipment in an IEEE 802.16m system which is an example of a wireless communication system.

FIG. 2 is a state diagram of a user equipment in an IEEE 802.16m system which is an example of a wireless communication system.

As shown in FIG. 2, states of the user equipment (UE) may be broadly divided into a connected state and an unconnected state. The connected state may further be divided into a normal mode and a sleep mode. The unconnected state may further be divided into an idle mode and a Deregistration with Context Retention (DCR) mode. The sleep mode and the idle mode are defined to efficiently use power of the user equipment.

First, in the sleep mode, the user equipment operates using a sleep mode pattern including a listening window and a sleep window approved by a base station (BS) through transmission and reception of AAI-SLP-REQ/AAI-SLP-REQ messages between the user equipment and the base station for power saving of the user equipment. In the idle mode, the user equipment operates using a paging group, a paging cycle, and a paging offset approved by the base station through transmission and reception of AAI-DREG-REQ/AAI-DREG-CMD messages between the user equipment and the base station for wireless resource saving and power saving of the user equipment.

In the normal mode, the user equipment performs an operation for providing a service provided by a corresponding system using wireless resources. In the DCR mode, context of the user equipment is stored in the network during a predetermined time although the user equipment has been deregistered from the network.

Basic operations of the sleep mode are described as follows. In the case in which uplink or downlink traffic is not generated for a predetermined time in the normal mode, the user equipment transmits an AAI-SLP-REQ message to the base station in order to request switching to the sleep mode. Upon receiving the request for switching to the sleep mode through the AAI-SLP-REQ message, the base station finally approves the request through an AAI-SLP-REQ message. Through the AAI-SLP-REQ message, the user equipment receives an ID (SLPID) allocated to the user equipment, the ID being used to identify a user equipment operating in the sleep mode, and then operates in the sleep mode.

Here, primary parameters acquired through message transmission and reception between the user equipment and the base station include an initial sleep window for specifying the size of an initial sleep window interval, a final sleep window base and a final sleep window exponent for specifying the size of a final sleep window interval, a listening window for setting the size of a listening window interval. All the parameters are in units of frames. The sleep window is an interval during which the user equipment, which operates in the sleep mode, minimizes power consumption. During the sleep window interval, the user equipment does not receive downlink control information and downlink traffic. The listening window is an interval during which the user equipment, which operates in the sleep mode, exits the sleep window to receive an AAI-TRF-IND message transmitted by the base station and determines presence or absence of downlink traffic destined for the user equipment. Thus, the user equipment can receive downlink control information and downlink traffic during the listening window interval.

The following is a description of basic operations of the idle mode. In the case in which downlink or uplink traffic is not generated for a predetermined time in the normal mode, the user equipment transmits an AAI-DREG-REQ message to the base station in order to request switching to the idle mode and then operates in the idle mode upon receiving an AAI-DREG-CMD from the base station. A paging cycle requested by the user equipment is defined in the AAI-DREG-REQ message, and a paging group ID, a paging offset, and a paging cycle are defined in the AAI-SLP-REQ message that the base station transmits to the user equipment upon receiving the AAI-DREG-REQ message. The user equipment sets a paging unavailable interval and a paging listening interval using corresponding parameters.

The user equipment minimizes power consumption in the paging unavailable interval and receives an AAI-PAG-ADV message transmitted from the base station in the paging listening interval. The AAI-PAG-ADV message includes a paging group ID indicating a paging group to which the base station, which transmits the message, belongs, MAC address hash information indicating user equipments that require location update or network entry/reentry from among user equipments that operate in the idle mode, and an action code that describes respective procedures to be performed by user equipments.

In the case in which traffic destined for a user equipment that operates in the idle mode is generated, the base station transmits an AAI-PAG-ADV message to the user equipment in a next paging listening interval and the user equipment exits the idle mode and enters the normal mode upon receiving the AAI-PAG-ADV message.

A procedure for a user equipment to adjust transmission parameters (a frequency offset, a time offset, and transmission power) for uplink communication with a base station when performing a procedure such as network reentry and network entry in the idle mode is referred to as ranging.

Ranging includes 4 modes, initial ranging, handover ranging, periodic ranging, and bandwidth request ranging.

The initial ranging is a procedure for a user equipment to adjust transmission parameters (a frequency offset, a time offset, and transmission power) for uplink communication with a base station when performing an initial network entry procedure. The handover ranging is a procedure for a user equipment to simplify the procedure when performing a handover operation. The periodic ranging is a procedure for a user equipment to maintain uplink communication with a base station after performing a network entry procedure. The bandwidth request ranging is a procedure for a user equipment to request an uplink bandwidth upon generation of traffic to be transmitted to the base station.

In a wireless communication system, a ranging code (or a ranging preamble), which may be used to perform ranging according to the type of ranging, and a region (ranging channel) for transmitting the ranging code are allocated through a channel (for example, a broadcast assignment A-MAP IE) in which system information is broadcast by a network. For example, in order to perform handover ranging, the user equipment requests ranging by selecting a specific ranging code from among ranging codes for handover ranging and then transmitting the selected code to the network through a handover ranging channel. The network may identify the type of ranging through the received ranging code and a channel in which the ranging code has been transmitted.

In the IEEE 802.16m system, ranging channels may be classified into a synchronized ranging channel (S-RCH), which is a channel for ranging performed by a synchronized user equipment, and a non-synchronized ranging channel (NS-RCH), which is a channel for ranging performed by a non-synchronized user equipment. A bandwidth request channel through which a user equipment requests an uplink bandwidth when data to be transmitted by the user equipment is generated is present in the IEEE 802.16m system. Such ranging channels (S-RCH, NS-RCH) and a bandwidth request channel (BRCH) are used as concepts respectively corresponding to ranging opportunity and bandwidth request opportunity in a medium access control (MAC) layer.

On the other hand, a scheme used to transmit allocation information of the ranging channel and the ranging code and the ranging channel differ depending on the type of the base station.

For example, a base station that supports Wireless MAN-OFDMA with an FDM-based UL PUSC Zone and a base station such as a femto cell having a narrow coverage use S-RCHs when performing initial ranging, handover ranging, and periodic ranging since there is a low possibility that synchronization between the user equipment and the base station fails.

The allocation information of the ranging channel and the ranging code is basically transmitted through a Superframe Header (SFH) (SP1: Ranging Parameter (RP) code partition information for the S-RCH, allocation periodicity of the S-RCH, Subframe offset of the S-RCH, or the like).

Other base stations (e.g., macro, relay, and macro hot-zone base stations) use NS-RCHs when performing initial ranging and handover ranging and use S-RCHs when performing periodic ranging since user equipments have already been synchronized.

In addition, the allocation information of the ranging channel and the ranging code is basically transmitted through a Superframe Header (SFH) (SP1: RP code partition information for the NS-RCH, allocation periodicity of the NS-RCH, Subframe offset of the NS-RCH, or the like). The allocation information of the ranging channel may also be transmitted through an A-MAP or an Advanced Air Interface-System Configuration Descriptor (AAI-SCD) message. When the allocation information is transmitted through an A-MAP, allocation information of the NS-RCH for handover ranging may be transmitted through a broadcast assignment A-MAP IE or an AAI-HO-CMD in a subframe other than a subframe that has been used to allocate general broadcast data according to the decision of scheduling by the base station. In addition, when the allocation information of the ranging channel is transmitted using an AAI-SCD message, information such as the number of ranging codes for periodic ranging and an S-RCH allocation period is included in the message.

Figure 3:
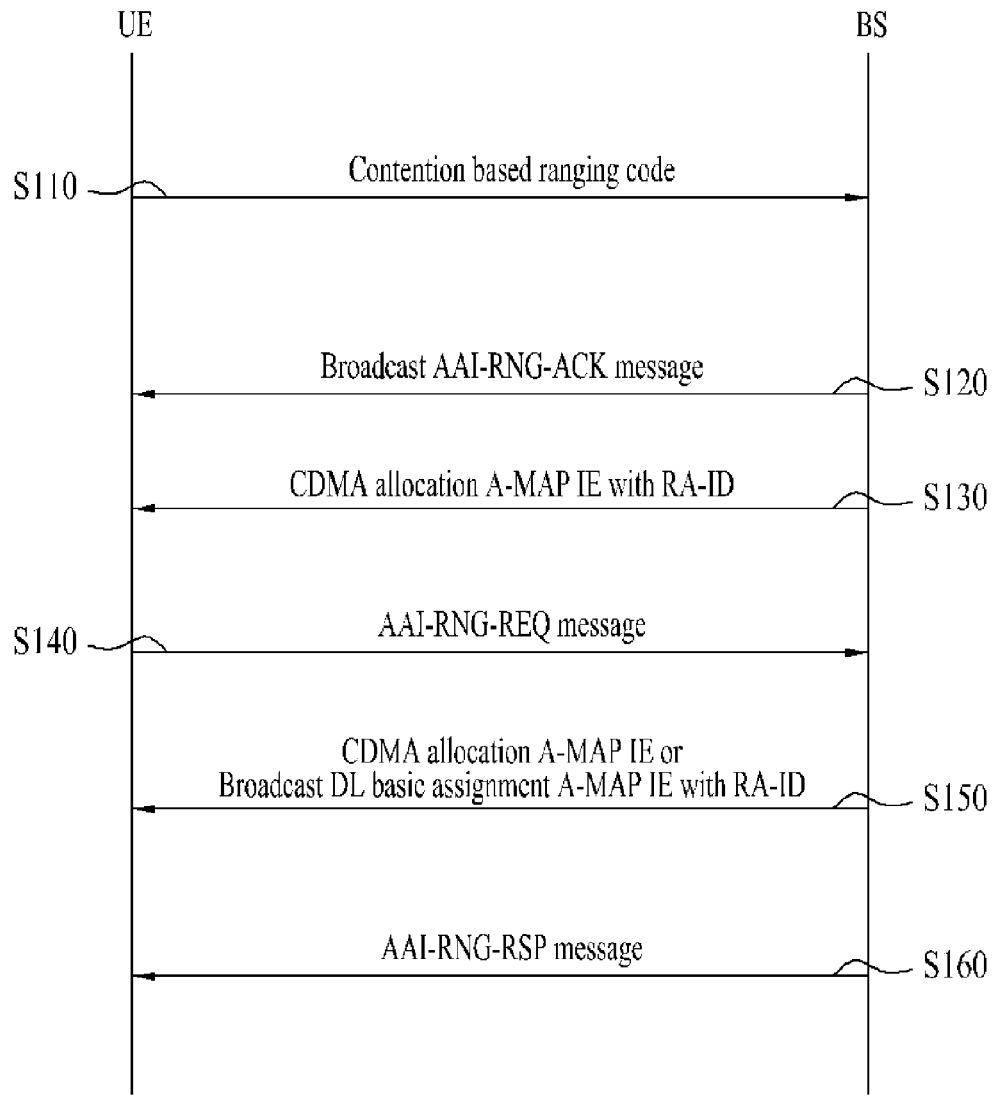
FIG. 3 illustrates a procedure for performing contention-based network reentry by a user equipment in an IEEE 802.16m system which is an example of the wireless communication system.

FIG. 3 illustrates a procedure performing contention-based network reentry by a user equipment in an IEEE 802.16m system which is an example of the wireless communication system.

As shown in FIG. 3, a user equipment selects a ranging channel and selects a contention-based ranging code and transmits the contention-based ranging code to a base station (BS) through the selected ranging channel (S110). When the base station has successfully received the ranging code, the base station transmits an AAI-RNG-ACK message to the user equipment by broadcast (S120). The AAI-RNG-ACK message is a message for providing a response indicating that the base station has successfully received and detected ranging codes in the ranging channel. In addition, the base station transmits a CDMA allocation A-MAP IE, which is allocation information of an uplink resource required for the user equipment to transmit an AAI-RNG-REQ message, after masking the CDMA allocation A-MAP IE with a random access identifier (RA-ID) (S130). The user equipment transmits the AAI-RNG-REQ message to the base station through the allocated uplink resource (S140) and the base station then transmits allocation information of a downlink resource, through which an AAI-RNG-RSP is to be transmitted, to the user equipment (S150). Here, the downlink resource allocation information may be transmitted to the user equipment through a broadcast DL basic assignment A-MAP IE or a CDMA allocation A-MAP IE masked with an RA-ID. Thereafter, the user equipment may receive an AAI-RNG-RSP message through the downlink resource.

Figure 4:
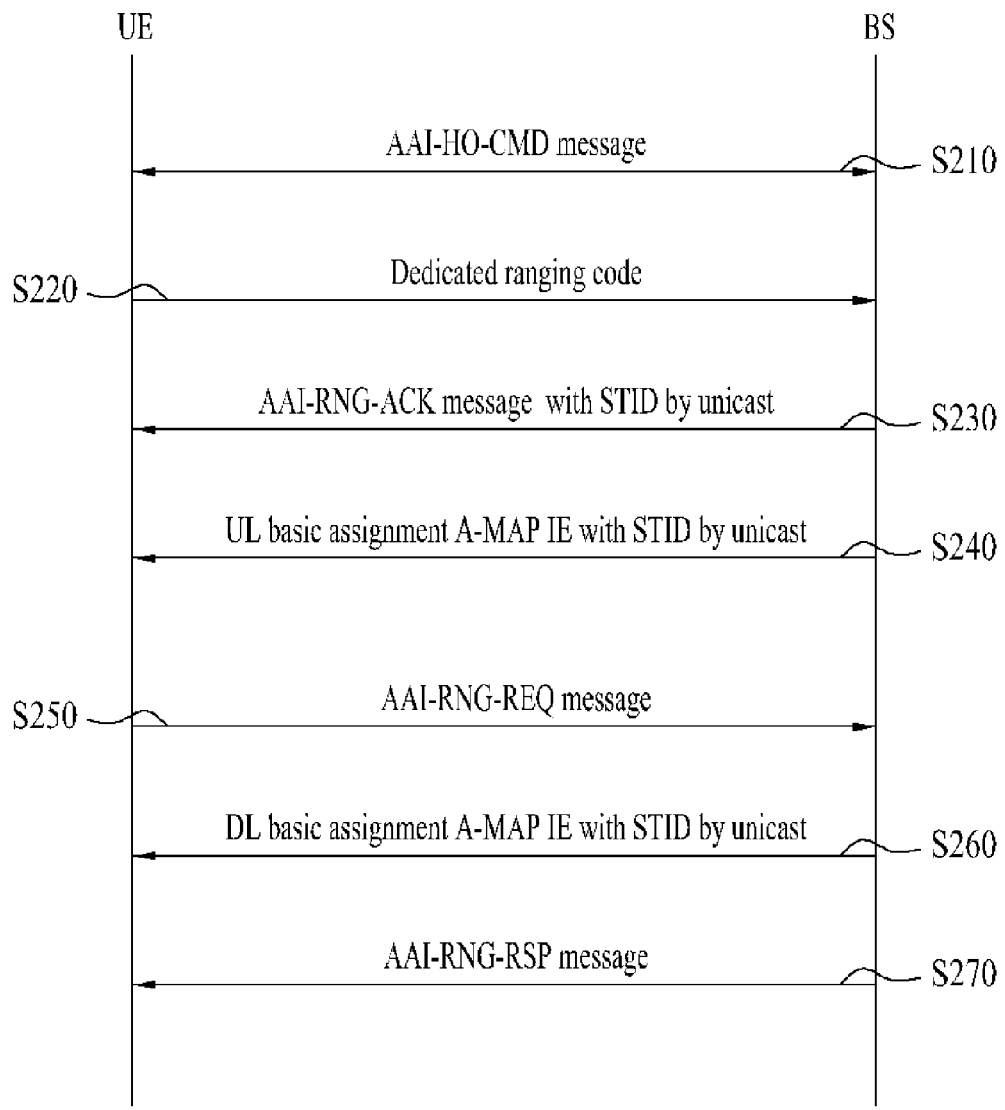
FIG. 4 illustrates a procedure for performing non-contention-based network reentry by a user equipment in an IEEE 802.16m system which is an example of the wireless communication system.

FIG. 4 illustrates a procedure for performing non-contention-based network reentry by a user equipment in an IEEE 802.16m system which is an example of the wireless communication system. This procedure is described below with reference to non-contention-based handover ranging as an example.

As shown in FIG. 4, a serving base station (BS) transmits a dedicated ranging code to a user equipment through an AAI-HO-CMD message (S210). The user equipment transmits the dedicated ranging code allocated to the user equipment to the target base station (S220). The target base station notifies the user equipment that the base station has successfully received the dedicated ranging code through an AAI-RNG-ACK message with a station identifier (STID) by unicast (S230). The target base station, which has received the dedicated ranging code, is aware of which user equipment has transmitted the dedicated ranging code. The AAI-HO-CMD message includes not only the dedicated ranging code but also a station identifier (STID) that the target base station has already allocated to the user equipment. In this case, the user equipment may not transmit an AAI-RNG-ACK message with an RA-ID since the user equipment has already acquired the STID. The target base station transmits allocation information of an uplink resource required for the user equipment to transmit an AAI-RNG-REQ message to the user equipment through an UL basic assignment A-MAP IE with a STID by unicast (S240). The user equipment transmits an AAI-RNG-REQ message to the target base station to the target base station through the allocated uplink resource (S250) and the base station transmits allocation information of a downlink resource, through which an AAI-RNG-RSP message is to be transmitted, through a DL basic assignment A-MAP IE with a STID (S260). Thereafter, the user equipment may receive the AAI-RNG-RSP message through the allocated downlink resource (S270).

As described above, in the case in which ranging for non-contention-based network reentry is performed, the base station transmits, to the user equipment, an AAI-HO-CMD message which includes a dedicated ranging code and an STID that the base station has already allocated to the user equipment. However, in the case in which an M2M device performs non-contention-based ranging for non-contention-based network reentry, there is a problem in discriminating the corresponding ranging procedure from other ranging procedures that are based on a conventional random access identifier (RA-ID) since the ranging procedure is performed based on an RA-ID.

First, the RA-ID is briefly described below. The RA-ID, which includes a total of 15 bits, is defined according to random access characteristics of a corresponding user equipment. Specifically, the RA-ID includes a 5-bit superframe number, a 2-bit frame index, a 6-bit preamble code index for ranging, and a 2-bit opportunity index for ranging. The 6-bit preamble code index indicates a ranging code and the 2-bit opportunity index indicates a ranging channel in which the ranging code is transmitted. Specifically, values of the opportunity index include '0b00' indicating a non-synchronized ranging channel (NS-RCH), '0b11' indicating a synchronized ranging channel (S-RCH), and '0b01/0b10' indicating a dynamic ranging channel. That is, the 6-bit ranging code and the 2-bit information indicating the ranging channel in which the ranging code is transmitted are primary elements for determining the RA-ID.

Figure 5:
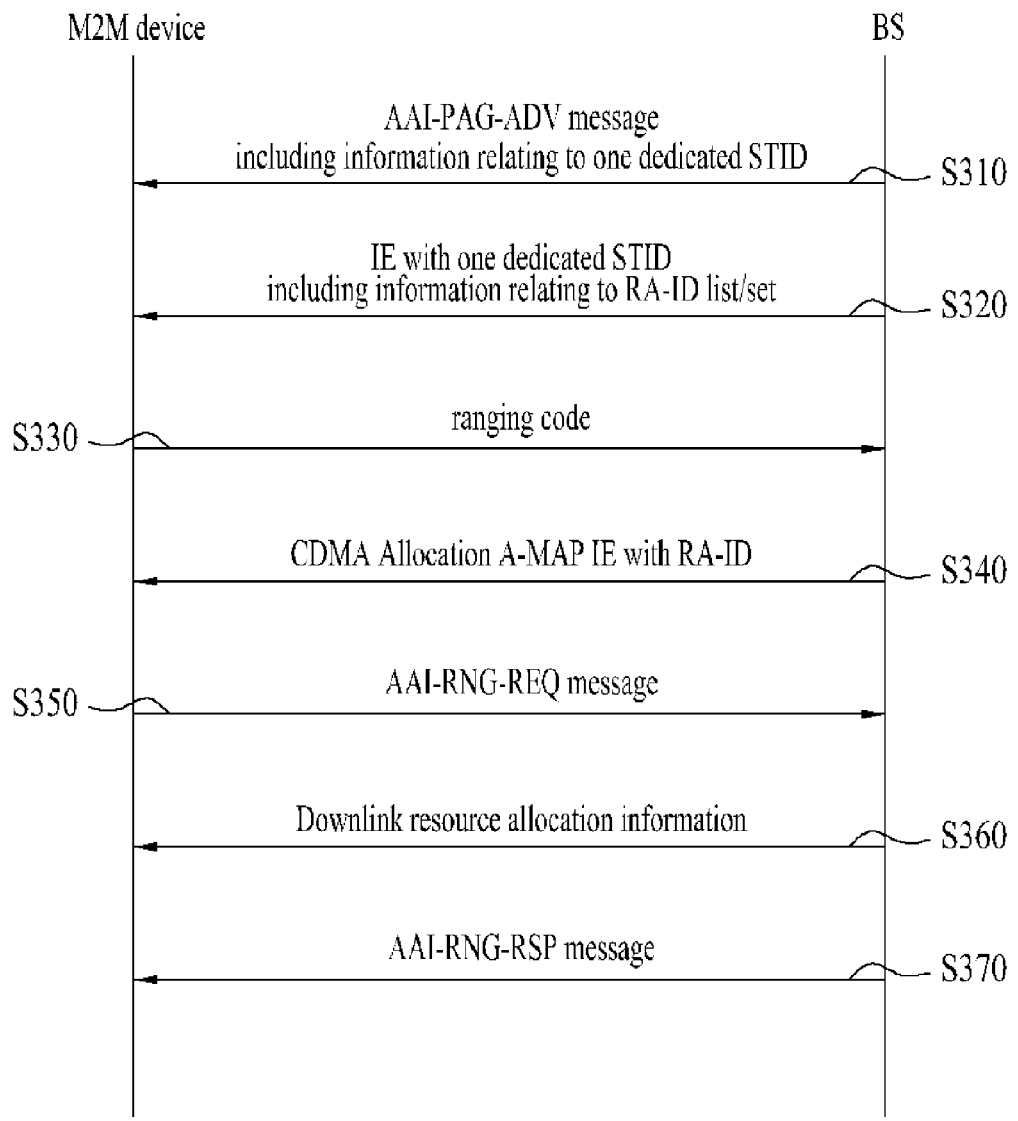
FIG. 5 illustrates a procedure for performing non-contention-based network reentry by an M2M device according to a first embodiment of the present invention.

FIG. 5 illustrates a procedure for performing non-contention-based network reentry by an M2M device according to a first embodiment of the present invention.

A base station (BS) may set a single dedicated identifier (for example, one dedicated STID). The single dedicated STID set by the base station is an ID that can be used by M2M devices or an M2M device that performs non-contention-based network reentry. The base station transmits an AAI-PAG-ADV message with the set dedicated STID by broadcast (S310).

The base station transmits, to the M2M device or M2M devices, a specific IE masked with the single set dedicated STID, the specific IE including information associated with an RA-ID list/set (S320). Information associated with the ranging channel and the dedicated ranging code may be included in information associated with the RA-ID list/set. The specific IE may correspond to a UL basic allocation A-MAP IE or a broadcast A-MAP IE. A new IE for transmitting the RA-ID list/set related information may also be defined. A CRC masking method for the single dedicated STID is described below in more detail with reference to Tables 1 and 3.

An M2M device selects a ranging channel and selects a ranging code and transmits the ranging code to the base station through the selected ranging channel (S330). The base station transmits a CDMA allocation A-MAP IE which is allocation information of an uplink resource required for the M2M device to transmit an AAI-RNG-REQ message after CRC-masking the A-MAP IE with an RA-ID (S340). The M2M device transmits an AAI-RNG-REQ message to the base station through the allocated uplink resource (S350) and the base station transmits allocation information of a downlink resource through which an AAI-RNG-RSP message is to be transmitted to the M2M device (S360). Thereafter, the M2M device may receive an AAI-RNG-RSP message through the downlink resource (S370).

In the case in which the M2M devices target a specific paging group, the single dedicated STID may be transmitted through inclusion in a field associated with a paging group ID in the AAI-PAG-ADV message. In the case in which the M2M devices are included in one M2M group, an M2M group identifier (MGID) may be used instead of the single dedicated STID.

The following Tables 1 to 3 are tables used to explain a CRC mask in the IEEE 802.16m system. A CRC includes a 1-bit masking prefix, a 3-bit type indicator, and 12 other bits.

TABLE 1

| Masking Prefix | Remaining 15 bit LSBs | |
|---|---|---|
| (1 bit MSB) | Type Indicator | Masking Code |
| 0b0 | 0b000 | 12 bit STID or TSTID |
| | 0b001 | Refer to Table 844 |
| | 0b010 | Refer to Table 845 |
| 0b1 | 15 bit RA-ID: The RA-ID is derived from the AMS' random access attributes (i.e., superframe number (LSB 5 bits), frame index (2 bits), preamble code index for ranging or BR (6 bits) and opportunity index for ranging or BR (2 bits)) as defined below: RA-ID = (LSB 5 bits of superframe number | frame_index | preamble_code_index | opportunity_index) | |

As shown in Table 1, the masking prefix is 1 bit information which is expressed as '0b0' or '0b1' and indicates a masking code according to the type indicator when the masking prefix is '0b0'. Only three values '0b000', '0b001', and '0b010' are defined for the type indicator. The type indicator indicates a 12-bit STID or TSTID when the type indicator is '0b000'. Reference is made to Table 844 when the type indicator is '0b001' and reference is made to Table 845 when the type indicator is '0b010'. Tables 844 and 845 correspond respectively to the following Tables 2 and 3.

TABLE 2

Table 844-Description of the Masking Code for type indicator 001

| Decimal Value | Description |
|---|---|
| 0 | Used to mask Broadcast Assignment A-MAP IE for broadcast or ranging channel assignment |
| 1 | Used to mask BR-ACK A-MAP IE |
| 2-128 | Used to mask Group Resource Allocation A-MAP IE (group ID) |
| Others | Reserved |

TABLE 3

Table 845-Description of the Masking Code for type indicator 010

| Decimal Value | Description |
|---|---|
| 4095 | Used to mask Broadcast Assignment A-MAP IE for multicast assignment |
| Others | Reserved |

The CRC masking method for the dedicated STID according to the present invention uses the same STID definition as the conventional definition in which the masking prefix is '0b0', the type indicator is '0b000', and the masking code consists of 12 bits. A CRC including a masking prefix value of '0b0', a type indicator value of '0b001', and a decimal value of '129' or '4095' may be defined as a CRC for masking a broadcast assignment A-MAP IE for allocating M2M device dedicated ranging resources. A CRC including a masking prefix value of '0b0', a type indicator value of '0b010', and a decimal value of '0' or '4094' may also be defined as a CRC for masking a broadcast assignment A-MAP IE for allocating M2M device dedicated ranging resources. A function index '0b11' included in the broadcast assignment A-MAP IE may be defined as an index for allocating M2M dedicated ranging resource allocation and this field may be defined such that information associated with an RA-ID list/set is included in the field. The same CRC masking method as described above may be equally applied when an MGID is used instead of a single dedicated STID.

Figure 6:
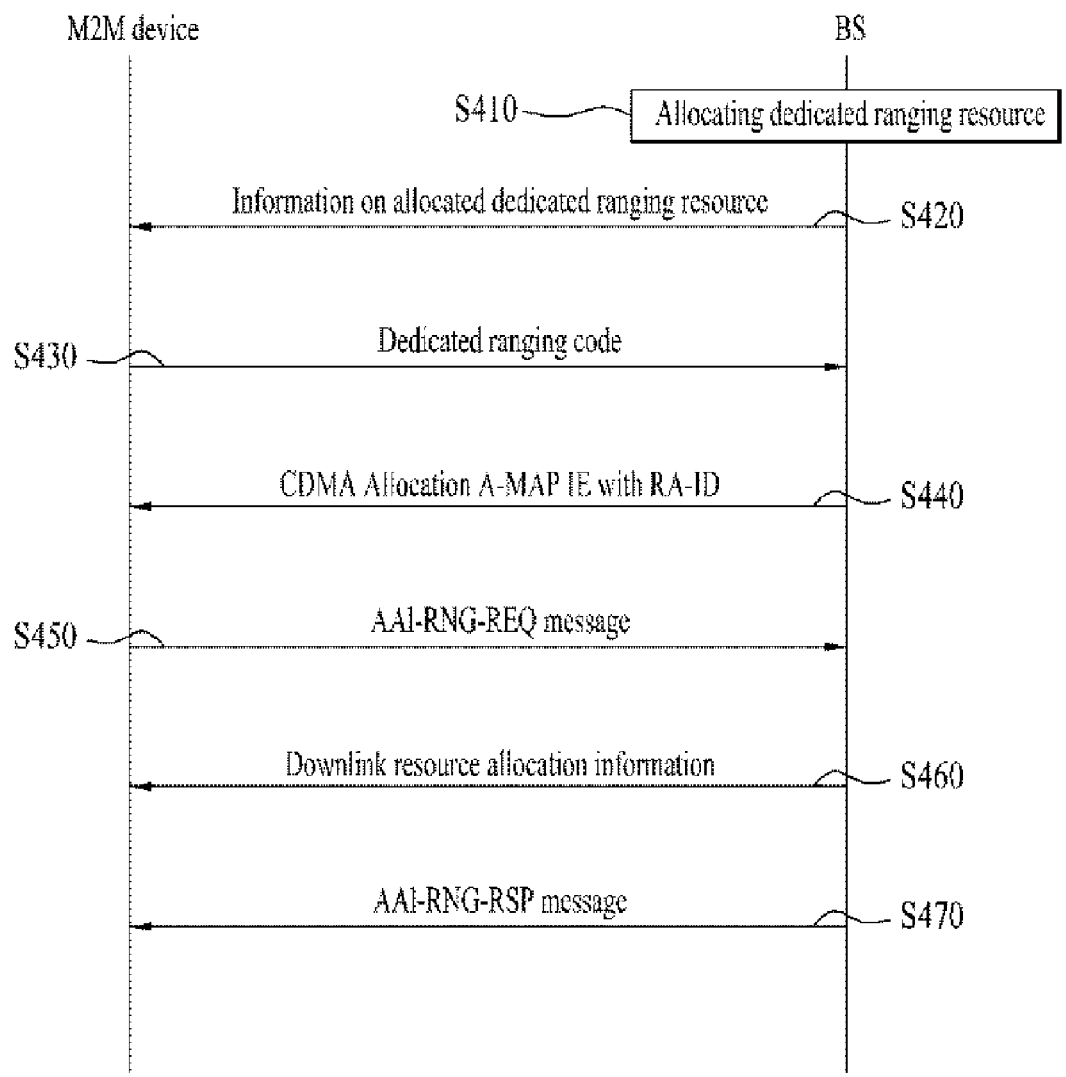
FIG. 6 illustrates a procedure for performing non-contention-based network reentry by an M2M device according to a second embodiment of the present invention.

FIG. 6 illustrates a procedure for performing non-contention-based network reentry by an M2M device according to a second embodiment of the present invention.

The base station may allocate, to an M2M device, a ranging resource dedicated to the M2M device, including a ranging channel (ranging opportunity), and a ranging code dedicated to the M2M device (S140). In this case, the M2M device performs non-contention-based network reentry using the dedicated ranging resource.

The base station transmits information associated with the dedicated ranging resource allocated to the M2M device to the M2M device (S420). A method of transmitting the information associated with the allocated M2M device dedicated ranging resource will be described in more detail. When the base station does not allocate the M2M device dedicated ranging resource, the M2M device can perform a procedure for network reentry using a ranging resource defined in an S-SFH SP1 IE.

Thereafter, the M2M device performs ranging for network reentry using the dedicated ranging resource allocated to the M2M device. That is, the M2M device transmits the dedicated ranging code allocated to the M2M device to the base station through the dedicated ranging channel allocated to the M2M device (S430). The base station transmits a CDMA allocation A-MAP IE which is allocation information of an uplink resource required for the M2M device to transmit an AAI-RNG-REQ message after masking the A-MAP IE with an RA-ID (S440).

Here, an opportunity index in the RA-ID with which the CDMA allocation A-MAP IE is masked may be set to one of '0b01' and '0b10' unlike the conventional purpose and usage. The set opportunity index may be used as a type indicator which indicates the M2M device dedicated ranging code or ranging channel. In this case, the opportunity index which indicates a dynamic ranging channel (for example, a dynamic NS-RCH) needs to be set to a different value. For example, when the opportunity index indicating the M2M device dedicated ranging code or ranging channel is set to '0b01', the dynamic ranging channel needs to be set to '0b10'.

The M2M device may transmit an AAI-RNG-REQ message to the base station through the allocated uplink resource (S450) and may then receive allocation information of a downlink resource through which an AAI-RNG-RSP message is to be transmitted from the base station (S460) and receive the AAI-RNG-RSP message from the base station (S470).

The following is a description of a method for notifying an M2M device or M2M devices of an M2M device dedicated ranging resource allocated to the M2M device or M2M devices. The notification method applied to H2H devices, in which information associated with the allocated dedicated ranging resource is transmitted to each H2H device using an AAI-HO-CMD message, is inappropriate in terms of overhead since the information should be individually transmitted to each of a number of M2M devices. Accordingly, the present invention suggests a method of broadcasting information associated with the allocated dedicated ranging resource through an S-SFH, an AAI-SCD message, a broadcast assignment A-MAP IE, or the like. In the case in which the S-SFH is used, there is a need to employ a cautious approach taking into consideration collision with H2H devices or the like since an S-SFH SP1 IE and an S-SFH SP2 IE do not have a sufficient space for additionally transmitting the information associated with the allocated dedicated ranging resource due to existing information items in the S-SFH SP1 IE and the S-SFH SP2 IE and an S-SFH SP3 IE is used to transmit system configuration information to all devices although the S-SFH SP3 IE has a space for additionally transmitting the information associated with the allocated dedicated ranging resource.

The following is a description of a method for transmitting information associated with an allocated M2M device dedicated ranging resource using an AAI-SCD message according to a first embodiment of the present invention. Preferably, the information associated with the allocated M2M device dedicated ranging resource may be transmitted within an AAI-SCD message and information for controlling the same may be transmitted within an S-SFH.

A dedicated ranging region and a dedicated ranging code index/set may be additionally defined in the AAI-SCD message. The dedicated ranging region indicates a ranging channel dedicated to the M2M device and the dedicated ranging code index indicates a ranging codetermination dedicated to the M2M device.

If the dedicated ranging region for the M2M device conventionally uses one subband in the frequency domain, another subband may be additionally allocated to the dedicated ranging region. The position of the additionally allocated subband may correspond to a resource index of a subband immediately next to a cell-specific ranging subband or may correspond to a resource index of a subband which is spaced by a specific offset value. This specific offset value may be predetermined or may be transmitted through an S-SFH.

It is also possible to indicate a subframe index of the ranging channel dedicated to the M2M device in the time domain. In this case, when a subframe is additionally allocated in an environment in which it is possible to support one subframe per frame or in an environment in which it is possible to support up to 2 subframes per frame when dynamic ranging is also taken into consideration, it is difficult to apply the corresponding method to a frame structure in which each frame includes 2 uplink subframes. To cope with this situation, it is possible to prohibit dedicated ranging allocation in the frame structure in which each frame includes 2 uplink subframes. For example, the validity of the subframe index may be determined according to an operation for indicating (or instructing) dedicated ranging allocation.

The dedicated ranging code index/set includes 5 bits and thus can provide up to 32M2M device dedicated ranging codes. An MGID may be added to this field to discriminate the respective ranging codes of M2M devices.

By transmitting an S-SFH and an AAI-SCD message, each of which includes a dedicated ranging change count field of dedicated ranging resource allocation information, it is possible to prevent H2H devices and unrelated M2M devices from unnecessarily decoding the dedicated ranging resource allocation information in the case in which the dedicated ranging resource allocation information is updated.

Information associated with an allocated M2M device dedicated ranging resource may be transmitted using a broadcast assignment A-MAP IE according to a second embodiment of the present invention. The broadcast assignment A-MAP IE includes a Number of Ranging opportunities field, a subframe index field, and a ranging opportunity index field. Using these fields, it is possible to provide information associated with a dedicated ranging channel and a dedicated ranging code.

The broadcast assignment A-MAP IE also includes a function index field. This function index is information indicating which information is delivered by the broadcast assignment A-MAP IE. Specifically, the function index indicates that the broadcast assignment A-MAP IE delivers broadcast assignment information when the function index is '0b00' and indicates that the broadcast assignment A-MAP IE delivers handover ranging channel allocation information when the function index is '0b01'. In addition, the function index indicates that the broadcast assignment A-MAP IE delivers multicast assignment information when the function index is '0b10' and the remaining value '0b11' is reserved. Here, when the function index is '0b01', the function index indicates a dynamic ranging channel for handover with two ranging opportunity indices. One of the two ranging opportunity indices may be used to allocate a ranging resource dedicated to the M2M device.

The reserved value '0b11' of the function index may be defined to indicate M2M device dedicated ranging. Thus, when the function index is '0b11', M2M device dedicated ranging resource allocation information (for example, a subframe index, a ranging channel index, and a ranging code index) may be transmitted within the field.

In a method for transmitting information associated with an allocated M2M device dedicated ranging resource according to a third embodiment of the present invention, it is possible to define an M2M device dedicated broadcast assignment A-MAP IE that can be received and decoded by only the M2M device. To accomplish this, an M2M device dedicated broadcast assignment A-MAP IE may be transmitted after being CRC-masked with an MGID or an M2M device dedicated STID. This can prevent H2H devices and unrelated M2M devices from decoding the M2M device dedicated broadcast assignment A-MAP IE.

Always decoding the M2M device dedicated broadcast assignment A-MAP IE may impose a burden upon M2M devices in which low power consumption is required. Accordingly, an M2M dedicated ranging indicator field may be set in the S-SFH SP3 IE suggested in the above description to allow M2M devices to decode the M2M device dedicated broadcast assignment A-MAP IE only when the field indicates M2M device dedicated ranging. In this case, a position (for example, a frame or a subframe) at which the M2M device dedicated broadcast assignment A-MAP IE is transmitted may be predetermined or may be transmitted through the S-SFH SP3 IE.

The present invention also suggests a method for an M2M device to choose whether to perform contention-based network entry or to perform non-contention-based network entry since non-contention-based network entry is not necessarily advantageous for the M2M device. Thus, the present invention also suggests a method for an M2M device to select a ranging resource, which has small delay or low latency, from among a dedicated ranging resource and a common ranging resource.

The following description will be given basically assuming that information associated with an M2M device dedicated ranging resource is transmitted through an AAI-SCD message. However, the present invention is not limited to this assumption. In the case in which there is a need to allocate a large amount of contention-based ranging resources to H2H devices depending on an environment of the wireless communication system, a relatively large amount of non-contention-based ranging resources may be allocated to M2M devices. On the other hand, in the case in which there is a need to allocate a large amount of non-contention-based ranging resources to H2H devices, a relatively large amount of contention-based ranging resources may be allocated to M2M devices.

A specific indicator that can be used to determine whether there is a need to allocate a large amount of contention-based ranging resources to M2M devices or there is a need to allocate a large amount of non-contention-based ranging resources to M2M devices according to each given environment may be defined, thereby efficiently utilizing limited resources.

In a first embodiment, an M2M dedicated ranging indicator in an S-SFH SP IE may be defined such that non-contention-based ranging is allowed when the M2M dedicated ranging indicator is '0b0' and only contention-based ranging is allowed when the indicator is '0b1'. Here, the M2M dedicated ranging indicator value '0b0' may indicate that both non-contention-based ranging and contention-based ranging are applicable. An M2M shared ranging allowance indicator may be additionally defined to allow only non-contention-based ranging. That is, the M2M shared ranging allowance indicator may be defined such that contention-based ranging is allowed when the M2M shared ranging allowance indicator is '0b0' and only non-contention-based ranging is allowed when the indicator is '0b1'.

On the contrary, the M2M dedicated ranging indicator may be defined such that contention-based ranging is allowed when the M2M dedicated ranging indicator is '0b0' and only non-contention-based ranging is allowed when the indicator is '0b1'. Here, the M2M dedicated ranging indicator value '0b0' may indicate that both non-contention-based ranging and contention-based ranging are applicable. An M2M shared ranging allowance indicator may be additionally defined to allow only contention-based ranging. That is, the M2M shared ranging allowance indicator may be defined such that non-contention-based ranging is allowed when the M2M shared ranging allowance indicator is '0b0' and only contention-based ranging is allowed when the indicator is '0b1'.

In a second embodiment, a 2-bit M2M dedicated ranging indicator may be defined to indicate all cases of the first embodiment. For example, a 2-bit M2M dedicated ranging indicator may be defined such that contention-based ranging is allowed when the indicator is '0b00', non-contention-based ranging is allowed when the indicator is '0b01', both contention-based ranging and non-contention-based ranging are allowed when the indicator is '0b10' and network entry/reentry of an M2M device is not allowed when the indicator is '0b11'.

In a third embodiment, the dedicated ranging related information, i.e., information indicating whether only contention-based ranging is allowed or only non-contention-based ranging is allowed, may be additionally defined in a 5-bit dedicated ranging code index/set included in an AAI-SCD message.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

INDUSTRIAL APPLICABILITY

A method performing network reentry by an M2M device according to the present invention can be applied to various wireless communication systems such as 3GPP LTE/LTE-A and IEEE 802.

The invention claimed is:

1. A method for performing network reentry by a Machine to Machine (M2M) device in a wireless communication system, the method comprising:
   receiving, by the M2M device, information associated with an uplink resource allocation for transmitting a ranging request message from a base station; and
   transmitting, by the M2M device, the ranging request message to the base station based on the received information associated with the uplink resource allocation,
   wherein the information associated with the uplink resource allocation is masked with a random access identifier (RA-ID) and the RA-ID includes an index representing that the uplink resource allocation is dedicated to the M2M device,
   wherein the index is set to one of '0b01' and '0b10,' and
   wherein the index in the RA-ID for a dynamic non-synchronous channel (NS-RCH) is set to a value which is not used for representing the uplink resource allocation is dedicated to the M2M device.

2. The method according to claim 1, wherein information associated with a dedicated ranging channel of the M2M device is included in an Advanced Air Interface-System Configuration Descriptor (AAI-SCD) message.

3. The method according to claim 1, wherein the information associated with the uplink resource allocation is a code division multiple access (CDMA) allocation advanced-MAP (A-MAP) information element (IE).

4. An apparatus for performing network reentry in a wireless communication system, the apparatus comprising:
   a receiver;
   a transmitter; and
   a processor configured to control the receiver to receive information associated with an uplink resource allocation for transmitting a ranging request message from a base station and configured to control the transmitter to transmit the ranging request message to the base station based on the received information associated with the uplink resource allocation,
   wherein the information associated with the uplink resource allocation is masked with a random access identifier (RA-ID) and the RA-ID includes an index representing that the uplink resource allocation is dedicated to the apparatus,
   wherein the index is set to one of '0b01' and '0b10,' and
   wherein the index in the RA-ID for a dynamic non-synchronous channel (NS-RCH) is set to a value which is not used for representing the uplink resource allocation is dedicated to the M2M device.

5. The apparatus according to claim 4, wherein information associated with a dedicated ranging channel of the apparatus is included in an Advanced Air Interface-System Configuration Descriptor (AAI-SCD) message.

6. The apparatus according to claim 4, wherein the information associated with the uplink resource allocation is a code division multiple access (CDMA) allocation advanced-MAP (A-MAP) information element (IE).

7. The apparatus of claim 4, wherein the apparatus is a Machine to Machine (M2M) device.

8. A method for performing network reentry of a Machine to Machine (M2M) device by a base station in a wireless communication system, the method comprising:
   transmitting, by the base station, information associated with an uplink resource allocation for transmitting a ranging request message to the M2M device; and
   receiving, by the base station, the ranging request message from the M2M device based on the information associated with the uplink resource allocation,
   wherein the information associated with the uplink resource allocation is masked with a random access identifier (RA-ID) and the RA-ID includes an index representing that the uplink resource allocation is dedicated to the M2M device,
   wherein the index is set to one of '0b01' and '0b10,' and
   wherein the index in the RA-ID for a dynamic non-synchronous channel (NS-RCH) is set to a value which is not used for representing the uplink resource allocation is dedicated to the M2M device.

9. The method according to claim 8, wherein information associated with a dedicated ranging channel of the M2M device is included in an Advanced Air Interface-System Configuration Descriptor (AAI-SCD) message.

10. An apparatus for performing network reentry of a Machine to Machine (M2M) device in a wireless communication system, the apparatus comprising:
    a transmitter;
    a receiver; and
    a processor configured to control the transmitter to transmit information associated with an uplink resource allocation for transmitting a ranging request message to the M2M device and configured to control the receiver to receive the ranging request message from the M2M device based on the information associated with the uplink resource allocation,
    wherein the information associated with the uplink resource allocation is masked with a random access identifier (RA-ID) and the RA-ID includes an index representing that the uplink resource allocation is dedicated to the M2M device,
    wherein the index is set to one of '0b01' and '0b10,' and
    wherein the index in the RA-ID for a dynamic non-synchronous channel (NS-RCH) is set to a value which is not used for representing the uplink resource allocation is dedicated to the M2M device.

11. The apparatus of claim 10, wherein the apparatus is a base station.

* * * * *